(12) United States Patent
Nakajima et al.

(10) Patent No.: US 7,675,563 B2
(45) Date of Patent: Mar. 9, 2010

(54) DIGITAL CAMERA

(75) Inventors: Yasumasa Nakajima, Nagano (JP);
Masanobu Shirakarwa, Nagano (JP);
Shuji Tsuji, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1121 days.

(21) Appl. No.: 11/129,570

(22) Filed: May 16, 2005

(65) Prior Publication Data

US 2005/0259173 A1  Nov. 24, 2005

Related U.S. Application Data

(63) Continuation of application No. PCT/JP03/14569, filed on Nov. 14, 2003.

(30) Foreign Application Priority Data

Nov. 15, 2002  (JP) .......................... P2002-332338
Jan. 14, 2003  (JP) .......................... P2003-005458

(51) Int. Cl.
*H04N 5/222* (2006.01)
(52) U.S. Cl. .............................. 348/333.05; 348/333.12
(58) Field of Classification Search ............ 348/333.05, 348/333.02, 333.11, 333.12, 231.99, 231.3
See application file for complete search history.

(56) References Cited

U.S. PATENT DOCUMENTS 6,262,769 B1 * 7/2001 Anderson et al. ........ 348/333.1

| 6,483,540 | B1 * | 11/2002 | Akasawa et al. ............ 348/239 |
| 7,317,485 | B1 * | 1/2008 | Miyake et al. ......... 348/333.02 |
| 2003/0026609 | A1 * | 2/2003 | Parulski ..................... 396/281 |

FOREIGN PATENT DOCUMENTS

| JP | 11-187314 A | 7/1999 |
| JP | 11-196362 A | 7/1999 |
| JP | 2001-45352 A | 2/2001 |
| JP | 2001-268499 A | 9/2001 |

* cited by examiner

*Primary Examiner*—Tuan Ho
(74) *Attorney, Agent, or Firm*—Sughrue Mion, PLLC

(57) ABSTRACT

A digital camera is characterized by an optical system for forming an optical image of a subject, conversion means for converting the formed optical image of the subject into a digital image, selection means for selecting a layout at the playback time of the digital image output by the conversion means, a display, determination means for determining the playback orientation of the digital image output by the conversion means with respect to the selected layout, display control means for combining an object indicating how to hold the digital camera at the ready in response to the determined playback orientation and a digital moving image output by the conversion means into one for display on the display in a state in which a still image record command can be entered, and image record means for storing a digital still image output by the conversion means in nonvolatile memory in association with the selected layout when a still image record command is entered.

8 Claims, 17 Drawing Sheets

```
SCRIPT
 PRINT SIZE: POSTCARD
 PRINT PAPER ORIENTATION: PORTRAIT
 COORDINATES OF SUBJECT IMAGE FRAME: (x1, y1), (x2, y2)
 ROTATION OF SUBJECT IMAGE: ROTATE 90 DEGREES COUNTERCLOCKWISE
 COORDINATES OF DEFAULT IMAGE FRAME: (x1, y1), (x2, y2)
 DEFAULT IMAGE: birthday.eff
```

α CHANNEL

72

70

FIG. 7
SUBORDINATE INFORMATION
ORIENTATION OF WHOLE THUMBNAIL: PORTRAIT
COORDINATES OF SUBJECT IMAGE FRAME: (x1, y1), (x2, y2)
ORIENTATION OF SUBJECT IMAGE FRAME: PORTRAIT
PARTIAL THUMBNAIL POINTER: OFFSET VALUE
COMPRESSED DATA
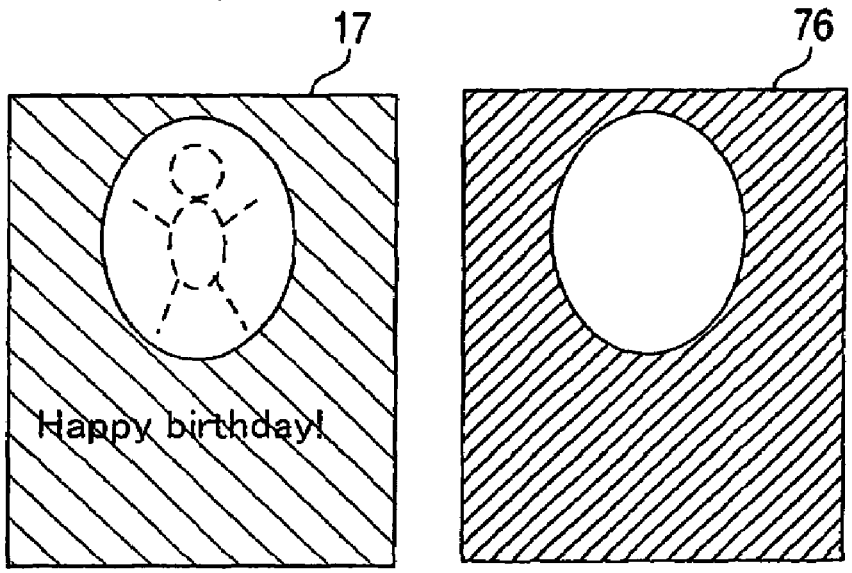
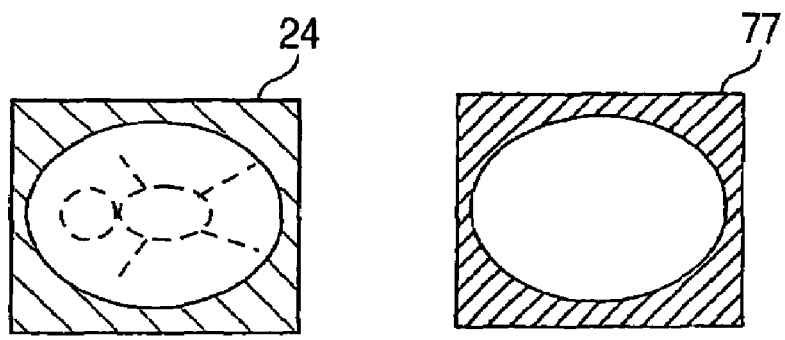

FIG. 15

| ORIENTATION OF WHOLE THUMBNAIL DESCRIBED IN CAMERA THUMBNAIL | ORIENTATION OF SUBJECT IMAGE FRAME DESCRIBED IN CAMERA THUMBNAIL | PLAYBACK ORIENTATION OF SUBJECT IMAGE | HOW TO CORRECTLY HOLD DIGITAL CAMERA AT READY (ORIENTATION OF LCD) |
|---|---|---|---|
| PORTRAIT | PORTRAIT | LANDSCAPE | LANDSCAPE |
| PORTRAIT | LANDSCAPE | PORTRAIT | PORTRAIT (WITH LEFT AS TOP) |
| LANDSCAPE | PORTRAIT | PORTRAIT | PORTRAIT (WITH LEFT AS TOP) |
| LANDSCAPE | LANDSCAPE | LANDSCAPE | LANDSCAPE |

DIGITAL CAMERA

This application is a continuation application of International Application No. PCT/JPO3/14569, filed Nov. 14, 2003, claiming priority of Japanese Patent Application Nos. 2002-332338 and 2003-005458 filed on Nov. 15, 2002 and Jan. 14, 2003, respectively, the disclosures of which are incorporated herein by reference.

BACKGROUND OF THE INVENTION

This invention relates to a digital camera.

A digital camera has a use of recording data as material of a composite image, for example. The composite image is widely used to print a greeting card with a photo, a framed photo seal, etc.

Patent document 1 (JP-A-2001-45352 (refer to paragraph 0030, FIG. 7c)) discloses a digital camera for combining a still image to combine (default image) previously stored in nonvolatile memory, etc., and an image representing a subject (subject image) into one for display until a shutter switch is pressed in a photographing mode.

However, according to the digital camera disclosed in patent document 1, if the default image selected by the user does not contain any pixels to be superposed on a subject image, the user cannot distinguish between a state in which no default image is selected and a state in which a default image is selected in the photographing mode; this is a problem. The default image not containing any pixels to be superposed on a subject image is an image a part of the front of which the whole of a subject image is laid out for.

Patent document 1 also discloses a digital camera for combining a default image previously stored in nonvolatile memory, etc., and a subject image into one image for display until a shutter switch is pressed in a photographing mode. As a default image and a subject image are combined into one for display in the photographing mode, appropriate framing responsive to the pattern of the default image is made possible.

Generally, the top and bottom of a default image are determined by the pattern represented by the default image. Generally, information defining how a default image and a subject image are to be combined is previously recorded in nonvolatile memory, etc., together with the default image. To select a default image and record a subject, the user must frame with a camera at the ready so that the top and bottom of the pattern represented by the default image match the top and bottom of the subject image when the default image and the subject image are combined based on the information previously recorded in nonvolatile memory, etc. However, if the user cannot determine the top and bottom of the default image from the default image displayed in the photographing mode, the user cannot determine at the photographing time which of portrait and landscape orientations the user should frame in with the camera at the ready to find a match between the top and bottom of the pattern represented by the default image and the top and bottom of the subject image in a playback mode.

SUMMARY OF THE INVENTION

It is an object of a first aspect of the invention to provide a digital camera for enabling the user to easily distinguish between a state in which no default image is selected and a state in which a default image is selected in the photographing mode.

It is an object of a second aspect of the invention to provide a digital camera for making possible appropriate framing responsive to the layout at the playback time when the layout at the playback time is selected before a subject is recorded.

In order to solve the aforesaid object, the invention is characterized by having the following arrangement.

(1) A digital camera comprising:
 an optical system that forms an optical image of a subject;
 a conversion unit that converts the formed optical image of the subject into a digital image;
 selection means that selects a default image to be combined with the digital image output by said conversion means;
 a display;
 a determination unit that determines whether or not the selected default image contains a pixel to be superposed on the digital image output by the conversion unit;
 a display controller, if a default image having a pixel to be superposed on the digital image output by the conversion unit is selected, combines a thumbnail image of the selected default image and a digital moving image output by the conversion unit into one for display on the display in a state in which a still image record command can be entered, and if a default image not containing any pixel to be superposed on the digital image output by the conversion unit is selected, combines a predetermined object and a digital moving image output by the conversion unit into one for display on the display in a state in which a still image record command can be entered; and
 an image recorder that stores a digital still image output by the conversion unit in nonvolatile memory in association with the selected default image when a still image record command is entered.

(2) The digital camera according to (1), wherein the object is a belt-like pattern displayed in a margin of said display.

(3) A digital camera comprising:
 an optical system for forming an optical image of a subject;
 a conversion unit that converts the formed optical image of the subject into a digital image;
 a selection unit that selects a layout at the playback time of the digital image output by the conversion unit;
 a display;
 a determination unit that determines playback orientation of the digital image output by the conversion unit with respect to the selected layout;
 a display controller that combines an object indicating how to hold the digital camera at the ready in response to the determined playback orientation and a digital moving image output by the conversion unit into one for display on the display in a state in which a still image record command can be entered; and
 an image recorder that stores a digital still image output by the conversion unit in nonvolatile memory in association with the selected layout when a still image record command is entered.

(4) The digital camera according to (3), wherein the determination unit determines the playback orientation of the digital image output by the conversion unit by information defining the playback orientation of the digital image output by the conversion unit.

(5) The digital camera according to (3), wherein the determination unit determines the playback orientation of the digital image output by the conversion unit by coordinates defining a placement area of the digital image output by the conversion unit at the playback time of the digital image.

(6) The digital camera according to (3), wherein the object is a pattern indicating an upper direction in a state in which said digital camera is correctly held at the ready.

(7) The digital camera according to (3), wherein the object is a belt-like pattern displayed in a margin of a screen as an upper margin in a state in which said digital camera is correctly held at the ready.

(8) The digital according to (3), wherein the object is an arrow indicating an upper direction in a state in which said digital camera is correctly held at the ready.

(9) The digital camera according to (3), further comprising:
an attitude detection unit that detects an attitude of a cabinet housing said optical system; and
a warning unit that issues a warning in response to the detected cabinet attitude and the determined playback orientation.

(10) A display control method of a digital camera comprising an optical system for forming an optical image of a subject, a conversion unit for converting the formed optical image of the subject into a digital image, a selection unit for selecting a layout at the playback time of the digital image output by the conversion unit, and a display, the method comprising:
determining playback orientation of the digital image output by the conversion unit with respect to the selected layout;
combining an object indicating how to hold the digital camera at the ready in response to the determined playback orientation and a digital moving image output by the conversion unit into one for display on said display in a state in which a still image record command can be entered; and
storing a digital still image output by the conversion unit in nonvolatile memory in association with the selected layout when a still image record command is entered.

The functions of the plurality of means included in the first or second aspect of the invention are provided by hardware resources whose functions are determined by the configuration, hardware resources whose functions are determined by programs, or a combination thereof. The functions of the plurality of means are not limited to those provided by hardware resources physically independent of each other. The first or second aspect of the invention can be specified not only as the invention of an apparatus, but also as the invention of a program, the invention of a record medium recording the program, and the invention of a method.

BRIEF DESCRIPTION OF THE DRAWINGS

FIG. 7 is a schematic drawing to show the contents of a camera thumbnail according to the first embodiment of the invention.

FIG. 15 is a table to show an algorithm for determining the display position of a belt.

DETAILED DESCRIPTION OF PREFERRED EMBODIMENTS

First Embodiment

To begin with, an embodiment of the first aspect of the invention will be discussed based on a first embodiment.

Figure 2:
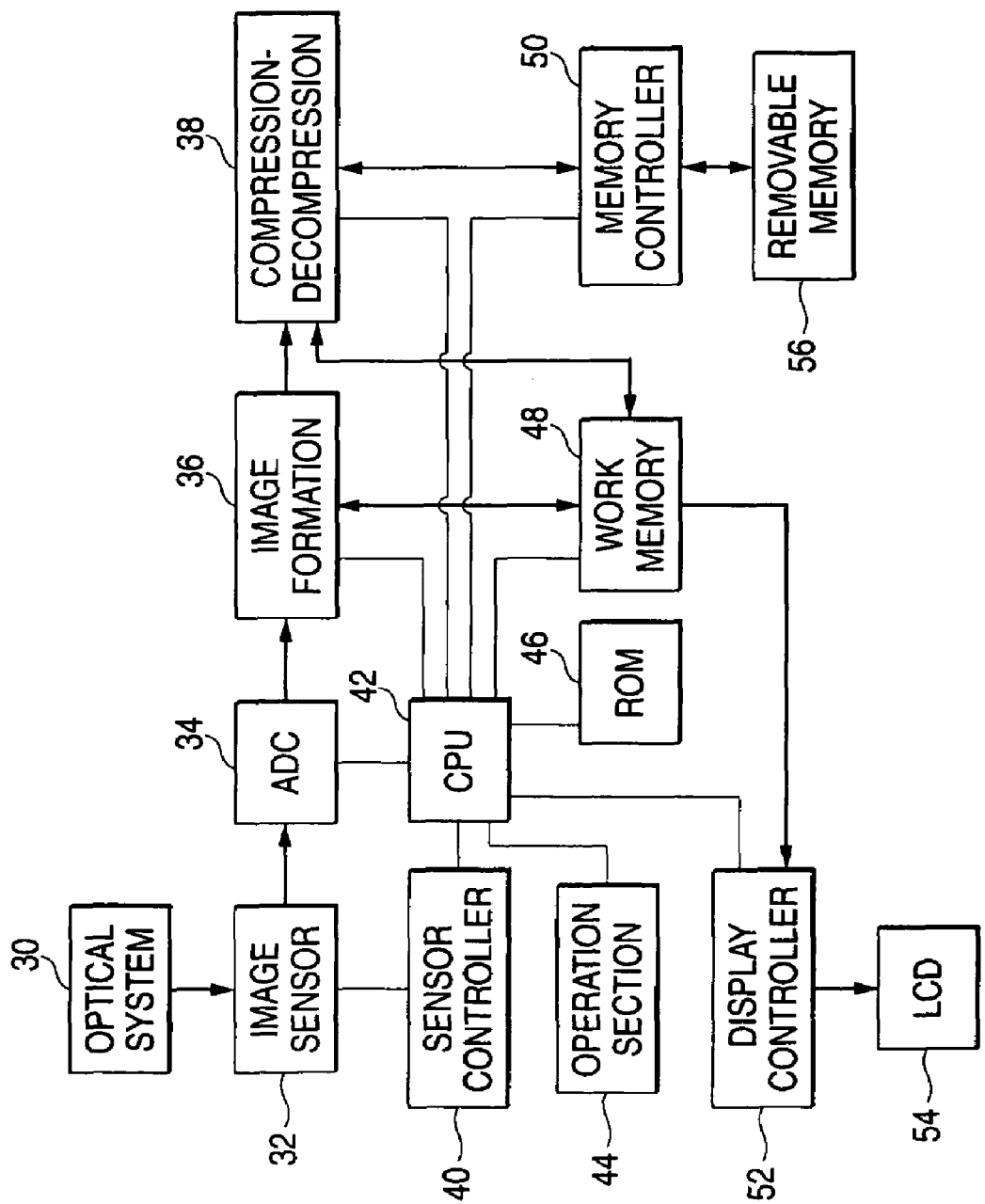
FIG. 2 is a block diagram to show a digital camera according to the first embodiment of the invention.
Figure 3:
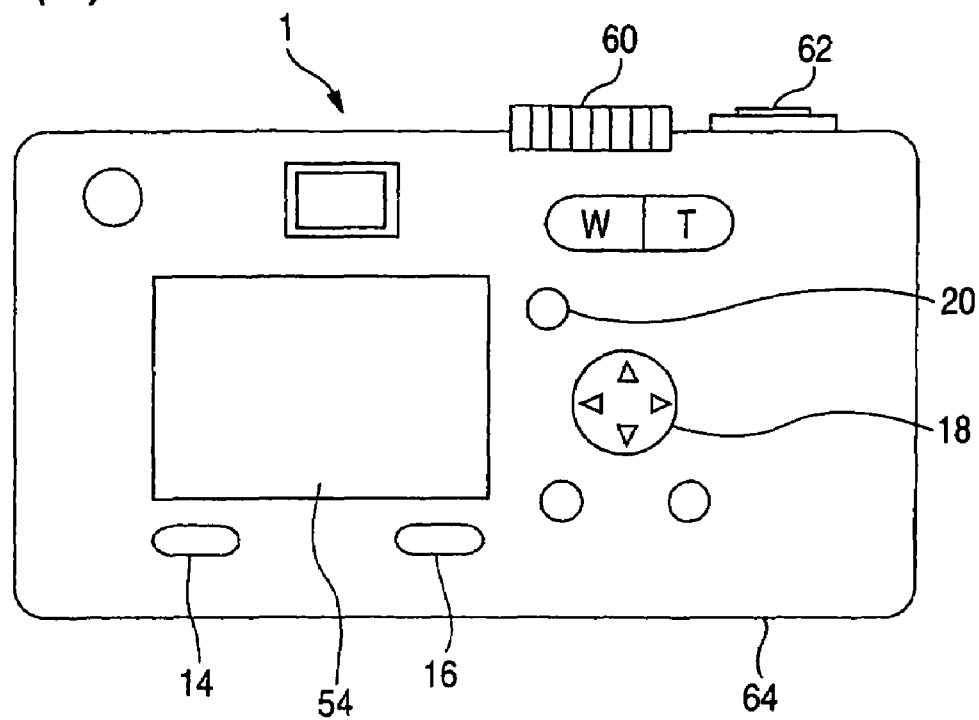
FIG. 3 (A) is a rear view of the digital camera and FIG. 3 (B) is a front view of the digital camera according to the first embodiment of the invention.
Figure 3:
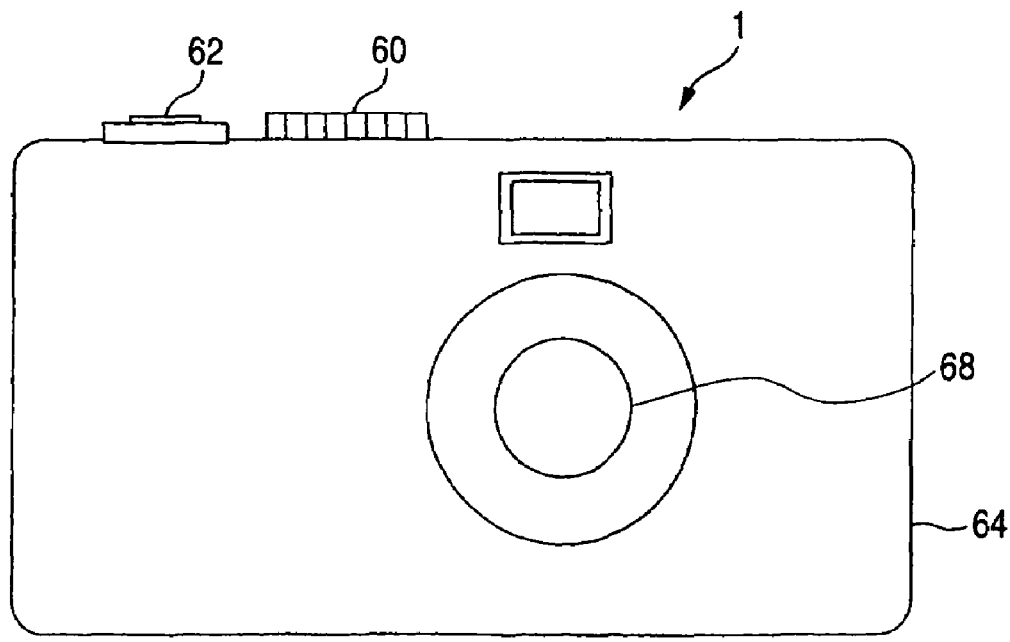

FIG. 2 is a block diagram to show the configuration of a digital camera 1 according to the first embodiment of the invention. FIGS. 3A and 3B are a rear view and a front view to show the appearance of the digital camera 1.

An optical system 30 is made up of a lens 68, an aperture, etc., housed in a cabinet 64. The optical system 30 forms an optical image of a subject on the light reception face of an image sensor 32.

The image sensor 32 as conversion means is an area image sensor including photoelectric conversion elements discretely placed in a two-dimensional space and charge transfer devices such as CCD (Charge Coupled Device). The image sensor 32 is driven by a sensor controller 40. The image sensor 32 stores the charges provided by executing photoelectric conversion for a given time for each photoelectric conversion element and outputs an electric signal responsive to the light reception amount for each photoelectric conversion element. Four complementary color filters of C (Cyan), M (Magenta), Y (Yellow), and G (Green) or primary color filters of R (Red), G (green), and B (Blue) are provided on the light reception face, whereby it is made possible to form a color image.

An A/D conversion section (ADC) 34 as conversion means quantizes an analog signal output from the image sensor 32 for conversion to a digital signal. Specifically, for example, the ADC 34 performs reduction processing of noise contained in the analog signal, level adjustment processing of the analog signal by gain control, quantization processing, etc.

An image formation section 36 as conversion means performs image formation processing, white balance correction, γ correction, color space conversion, etc., for the digital signal output from the ADC 34, and outputs image data representing R, G, and B gradation values, Y, Cb, and Cr gradation values, etc., for each pixel. The image formation processing mentioned here is processing of interpolating a pixel made of one-color density information by different-color density information of a nearby pixel, thereby outputting digital image data having three gradation values of R, G, and B or Y, Cb, and Cr for each pixel.

A compression-decompression section 38 as image record means compresses or decompresses digital image data. Specifically, it performs sequential conversion and entropy coding of digital image data, thereby compressing the digital image data and performs inverse conversion of the compressed digital image data, thereby decompressing the digital image data. Specifically, for example, the compression-decompression section compresses the digital image data using discrete cosine transform, wavelet transform, run length coding, Huffman coding, etc. The digital image data compressed by the compression-decompression section 38 is stored in removable memory 56 as nonvolatile memory by a memory controller 50.

An operation section 44 as selection means includes a dial switch 60, pushbutton switches 14, 16, and 20, a cross key 18, a shutter switch 62, etc. The dial switch 60 is a dial switch for setting a mode such as a photographing mode or a playback mode in response to the rotation angle of the switch. The pushbutton switch 20 is a switch for calling a menu on an LCD (Liquid Crystal Display) 54. The pushbutton switches 14 and 16 and the cross key 18 are switches for operating a menu displayed on the LCD 54. The shutter switch 62 is a switch for entering a still image record command. In the photographing mode, the user can enter a still image record command by pressing the shutter switch 62.

The LCD 54 as a display functions as an electronic view finder in the photographing mode. A display controller 52 includes frame memory for storing digital image data of one screen of the LCD 54 and a display circuit for driving the LCD 54 based on the digital image data stored in the frame memory. In the photographing mode, a digital moving image representing a subject, a digital still image representing the whole or a part of an image to be combined with a still image representing a subject, α channel to combine the two images, an object indicating selection of an image to be combined with the digital image representing the subject, and an object forming a menu are stored in the frame memory. The display circuit combines the objects stored in the frame memory into one for display on the LCD 54.

The CPU 42 controls the whole digital camera 1 by executing a computer program stored in ROM 46. Work memory 48 is memory for temporarily storing a program and data. The program and various pieces of data stored in the ROM 46 may be downloaded through a network from a predetermined server for storage in the ROM 46 or may be read from a computer-readable storage medium such as removable memory for storage in the ROM 46.

Figure 4:
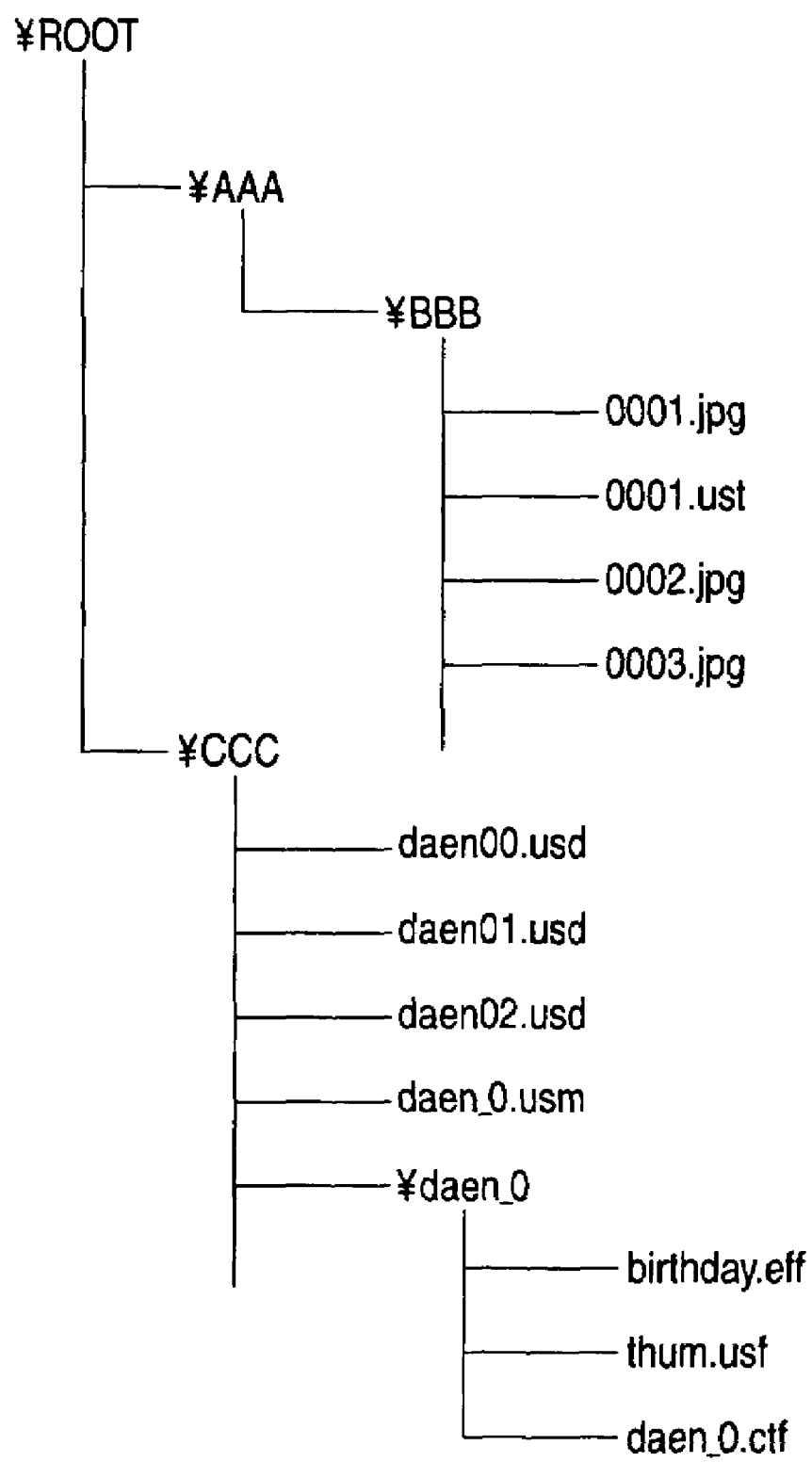
FIG. 4 is a schematic drawing to show directories of files according to the first embodiment of the invention.

FIG. 4 is a schematic drawing to show directories of files stored in the removable memory 56. A digital still image representing a subject (subject image) and information defining a layout at the playback time of the subject image (layout definition file) are stored in separate files. A file describing information associating the files with each other (associating file) is stored further as a separate file. The subject image and the layout definition file may be associated with each other, for example, as the information associating them with each other is stored in the file of the subject image; for example, as apart of the filename of the file of the subject image and a part of the file name of the layout definition file are made duplicate; or, for example, as the subject image and the layout definition file are stored in the same folder. The layout definition file may be previously stored in the ROM or may be previously stored in the removable memory 56.

A file with extension ".usd" is a layout definition file and is retained for each paper size. The layout definition file is described later in detail. A file with extension ".usm" is an index file. Index information of a plurality of layout definition files different in paper size and having similitude relation is described in the index file. Specifically, for example, the number of the layout definition files having similitude relation, the filenames of the layout definition files, and the like are described in the index file. A file with extension ".eff" contains a digital still image (default image) to be combined with a subject image based on the layout definition file. A file with extension ".usf" contains a playback apparatus thumbnail. The playback apparatus thumbnail is a thumbnail image file for displaying the layout defined in the layout definition file on a playback apparatus such as a printer or a personal computer. A file with extension ".ctf" contains a camera thumbnail. The camera thumbnail is a thumbnail image file for displaying the layout defined in the layout definition file as an image on the LCD 54 of the digital camera 1. The camera thumbnail is described later in detail. The default image, the playback apparatus thumbnail, and the camera thumbnail are stored in the folder of the same name as the filename of the index file describing the path of the layout definition file defining the layout displayed by the playback apparatus thumbnail and the camera thumbnail. That is, the camera thumbnail and the index file are associated with each other by the name of the folder in which the camera thumbnail is stored.

A file with extension ".jpg" contains a subject image. A file with extension ".ust" is the above-described associating file. The path of the index file is described in the associating file, and the same filename as the filename of the subject file to be associated with the layout definition file described in the index file is given to the associating file. That is, the subject file and the associating file are associated with each other by their filenames. The associating file and the index file are associated with each other by the path described in the associating file. The index file and the layout definition file are associated with each other by the path of the index file described in the layout definition file. As the files are associated with each other in such a manner, a plurality of layout definition files different in paper size and having similitude relation are associated with one subject file.

Figure 5:
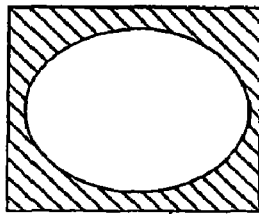
FIG. 5 is a schematic drawing to show the contents of a layout definition file according to the first embodiment of the invention.
Figure 6:
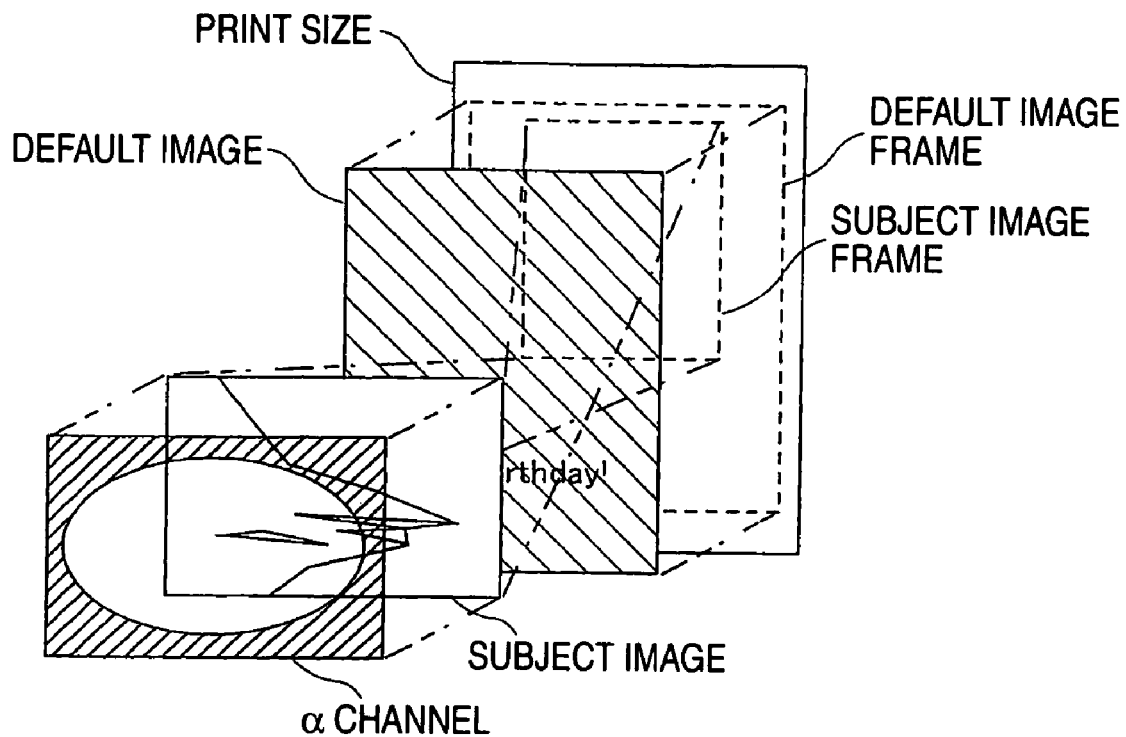
FIG. 6 (A) is a schematic drawing to describe an image played back using the layout definition file and FIG. 6 (B) is a plan view to show a postcard printed using the layout definition file according to the first embodiment of the invention.
Figure 6:
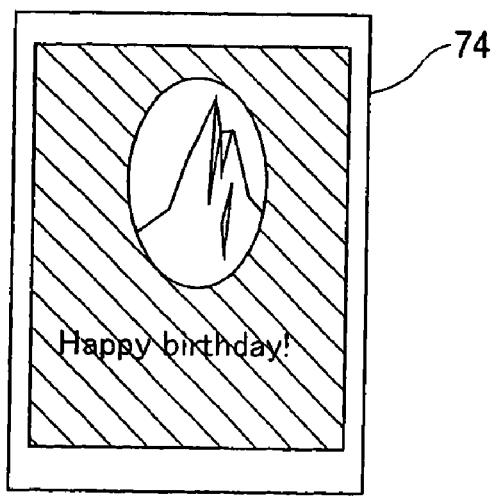

FIG. 5 is a schematic drawing to show the contents of a layout definition file 70. FIG. 6 (A) is a schematic drawing to describe an image played back using the layout definition file 70. FIG. 6 (B) is a plan view to show a postcard 74 printed using the layout definition file 70. The layout of the subject image is defined in the layout definition file 70 by a script. The script defines position information to place the subject image on print paper, information to rotate the subject image and place the subject image on print paper, information to scale up or down the subject image, etc., so that they can be interpreted uniquely in a printer, etc. Specifically, for example, the script defines the paper size (for example, "postcard"), information to define the print paper orientation (for example, "portrait"), information to define the frame for placing the subject image (subject image frame) (for example, upper right coordinates of the frame "(x1, y1)" and lower left coordinates of the frame "(x2, y2)"), information to define rotation when the subject image is placed in the frame (for example, "rotate 90 degrees counterclockwise"), information to determine the image to be combined with the subject image (default image) (for example, "birthday.eff" as the path of the default image), information to define the frame for placing the default image (for example, upper right coordinates of the frame "(x1, y1)" and lower left coordinates of the frame "(x2, y2)"), etc. An α channel 72 may be stored in the layout definition file 70. The α channel is information defining pixels of which of two images to reflect on the composite image for each pixel when the two images are superposed.

FIG. 7 is a schematic drawing to show the contents of a camera thumbnail 78. The camera thumbnail 78 stores a digital still image (whole thumbnail) 17 for representing the whole of the layout defined in the layout definition file 70 and a digital still image (partial thumbnail) 24 for representing the part of the default image to be superposed on the subject image. The camera thumbnail 78 also stores an α channel 76 for combining the whole thumbnail 17 and the subject image into one for display and an α channel 77 for combining the partial thumbnail 24 and the subject image into one for display. Preferably, the whole thumbnail 17, the partial thumbnail 24, and the α channels 76 and 77 are compressed in a data format such as JPEG. Further, the camera thumbnail 78 stores a partial thumbnail pointer pointing to the address of the partial thumbnail 24 by the offset value, information to define the orientation of the whole thumbnail 17 (for example, "portrait"), information to define the frame for placing the subject image (for example, upper right coordinates of the frame "(x1, y1)" and lower left coordinates of the frame "(x2, y2)"), information to define the orientation of the frame for placing the subject image (for example, "portrait"), etc., as subordinate information. When image information of the partial thumbnail 24 does not exist, a null value is stored in the thumbnail pointer.

The orientation of the subject image frame is defined as "portrait" if the subject image is placed in portrait orientation when the whole thumbnail 17 is displayed in landscape orientation; it is defined as "landscape" if the subject image is placed in landscape orientation when the whole thumbnail is displayed in landscape orientation by way of example. However, the orientations of the whole thumbnail and the subject image frame may be defined in any manner if the orientations can be determined uniquely at the display time. For example, if the subject image should be placed in landscape orientation for observation, the subject image frame may be defined as "landscape;" if the subject image should be placed in portrait orientation for observation, the subject image frame may be defined as "portrait;" or the orientation may be defined according to any desired rotation angle. The human figure indicated by the dashed line in the figure indicates the correct orientation of the subject image placed in the subject image frame.

Figure 1:
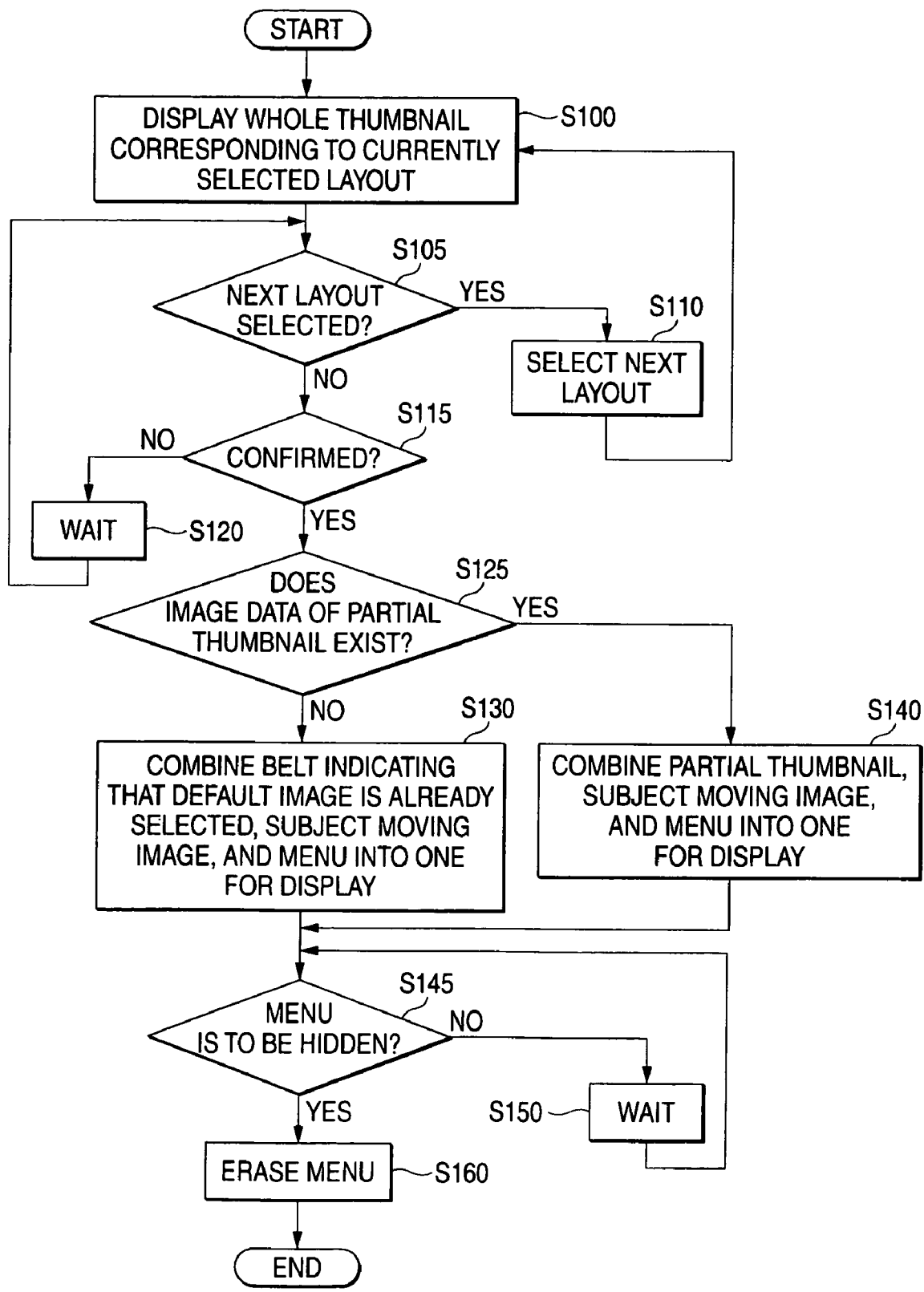
FIG. 1 is a flowchart to show a flow of control processing of an LCD according to a first embodiment of the invention.
Figure 8:
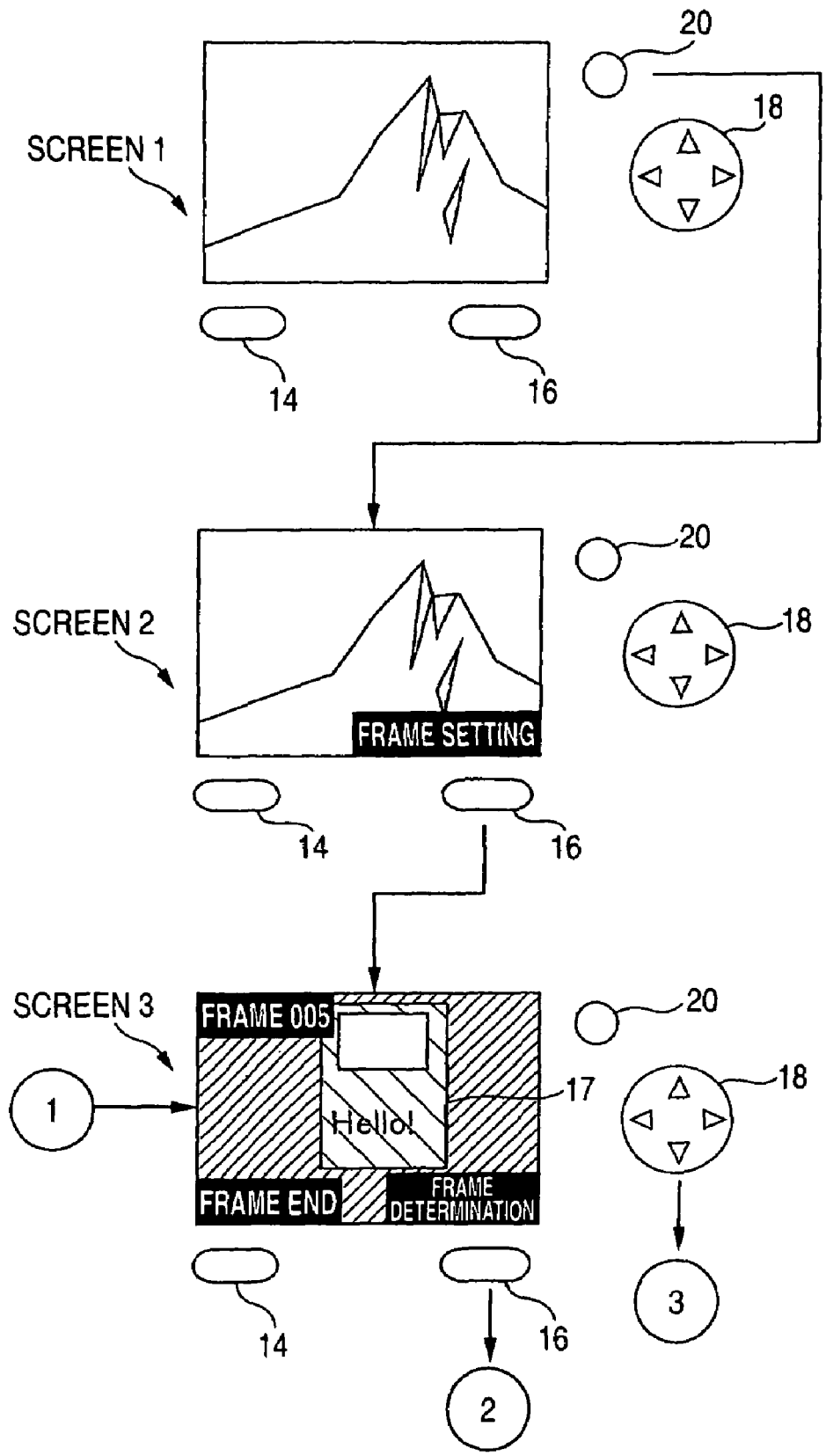
FIG. 8 is a schematic drawing to show screen transition of the LCD according to the first embodiment of the invention.
Figure 9:
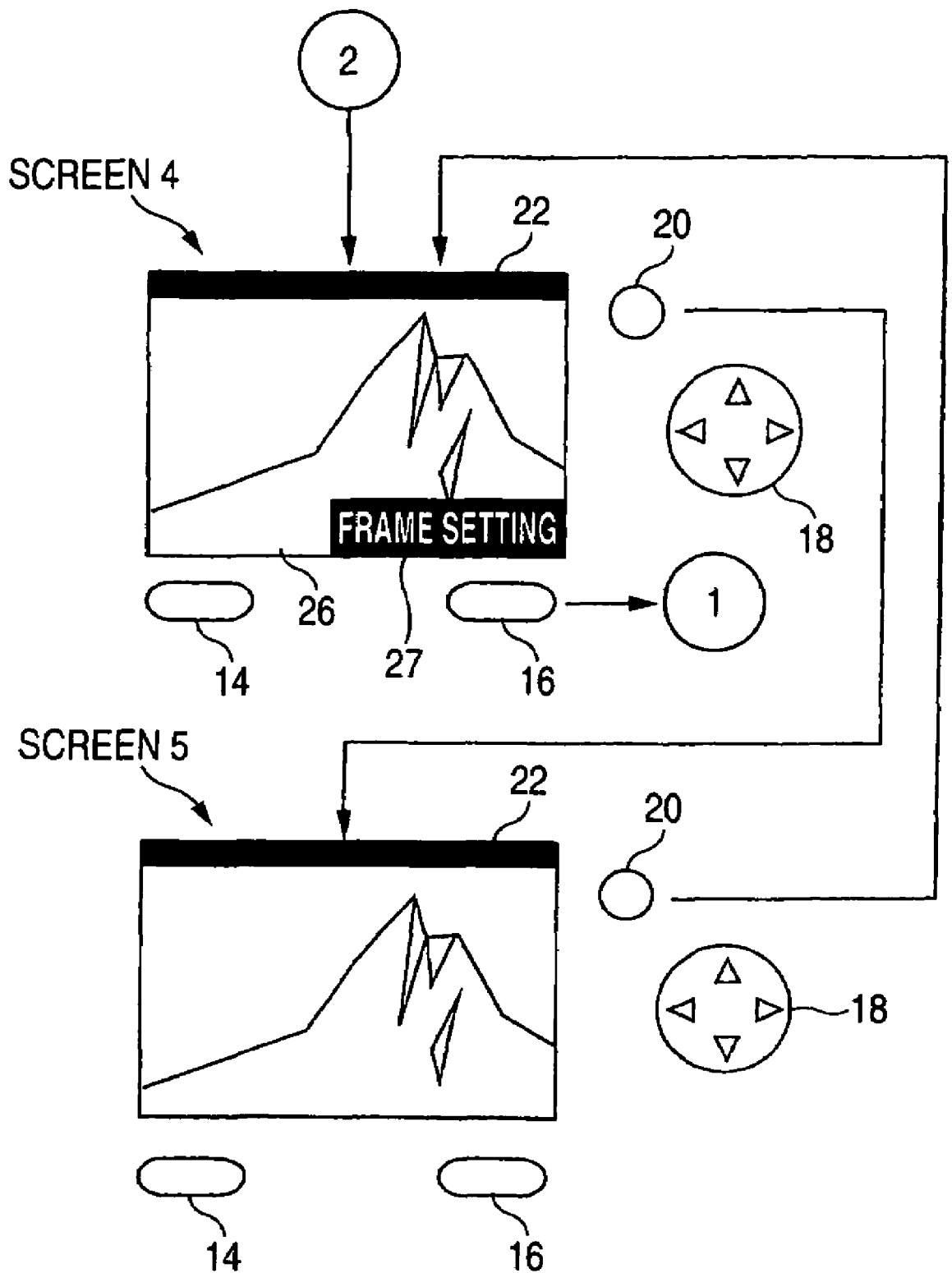
FIG. 9 is a schematic drawing to show screen transition of the LCD according to the first embodiment of the invention.
Figure 10:
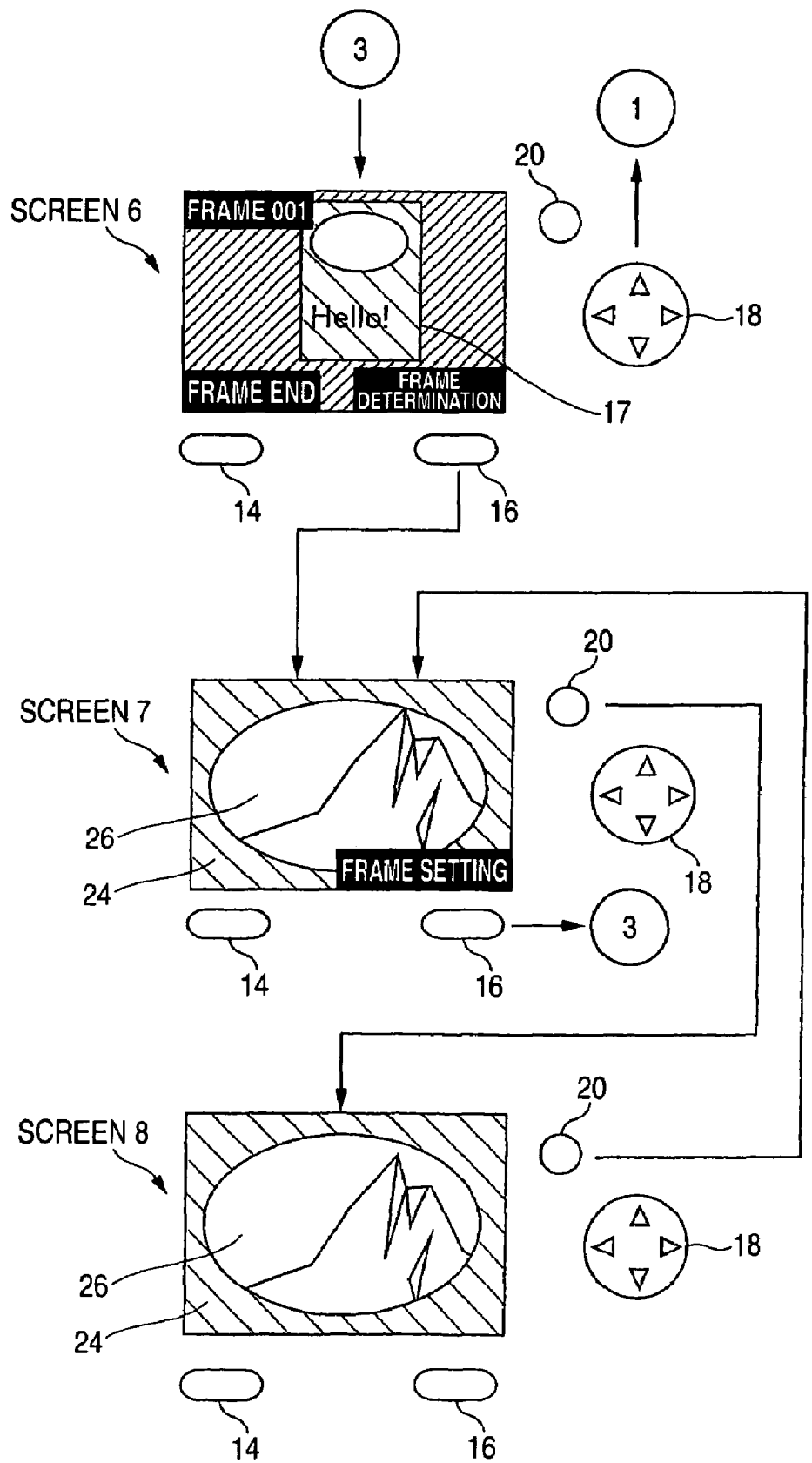
FIG. 10 is a schematic drawing to show screen transition of the LCD according to the first embodiment of the invention.

FIG. 1 is a flowchart to show a flow of control processing of the LCD 54 in the photographing mode of the digital camera according to the first embodiment. FIGS. 8, 9, and 10 are schematic drawings to show screen transition of the LCD 54. The processing shown in FIG. 1 is started when the pushbutton switch 20 and the pushbutton switch 16 are pressed in succession in the photographing mode, and proceeds as the CPU 42 executes a predetermined program stored in the ROM 46. As seen from the description that follows, the CPU 42 functions as selection means, determination means, display control means, and image record means by executing a predetermined program stored in the ROM 46.

At step S100, the whole thumbnail 17 corresponding to the currently selected layout is displayed as on screen 3 in FIG. 8. As any one index file is selected, a default image can be selected without specifying the paper size. Specifically, the name of the folder in which the camera thumbnail is stored and the index file are given a common name (for example, "daen_0") and therefore the name of the folder in which the camera thumbnail is stored or the filename of the camera thumbnail is selected, whereby a plurality of layout definition files having similitude relation and the camera thumbnail can be selected. A search is made for the whole thumbnail 17 corresponding to the currently selected layout based on the name of the folder in which the camera thumbnail is stored or the name of the folder in which the camera thumbnail is stored, and the whole thumbnail 17 is stored in the frame memory of the display controller 52 and is displayed on the LCD 54.

At step S105, whether or not the cross key 18 is pressed is determined, whereby whether or not the next layout is selected is determined. If the cross key 18 is pressed, the next layout is selected (S110) and then the process returns to step S100; if the cross key 18 is not pressed, the process goes to S115. Screen 6 in FIG. 10 is an example of the screen displayed at step S100 after the next layout is selected.

At step S115, whether or not the pushbutton switch 16 is pressed is determined, whereby whether or not the currently selected layout is confirmed is determined. If the pushbutton switch 16 is pressed, the process goes to S125; if the pushbutton switch 16 is not pressed, the process returns to step S105 after waiting for a predetermined time (step S120) When the layout definition file defining a default image is selected at step S115, the default image is selected.

At step S125, whether or not a pixel of the selected default image, to be superposed on the subject image exists is determined from the value of the partial thumbnail pointer of the subordinate information in the camera thumbnail corresponding to the currently selected default image. Specifically, for example, if the value of the partial thumbnail pointer is a null value, it is determined that a pixel to be superposed on the subject image does not exist.

If the default image does not contain any pixel to be superposed on the subject image, a subject moving image 26, a menu 27, and a belt 22 indicating the photographing mode in which the default image is selected are combined into one for display as on screen 4 in FIG. 9 (step S130). At this time, the belt 22 indicating the photographing mode in which the default image is selected is displayed in a corner of the screen as a width to allow the user to observe the subject moving image.

If the value of the partial thumbnail pointer is any other offset value than a null value at step S125, it is determined that a pixel to be superposed on the subject image exists, and the partial thumbnail 24 indicated by the offset value, the subject moving image 26, and the menu 27 are combined into one for display as on screen 7 in FIG. 10 (step S140).

To determine whether or not a pixel to be superposed on the subject image exists at step S125, here the value of the partial thumbnail pointer of the subordinate information in the camera thumbnail is used, but partial thumbnail or an α channel may be previously stored in the layout definition file and determination may be made based on the presence or absence of the data or one-bit data representing the presence or absence of a pixel to be superposed on the subject image may be previously stored and determination may be made based on the bit.

The object indicating the state in which the default image is selected may be any pattern or may be text (for example, "default image is being selected").

At step S145, whether or not the pushbutton switch 20 is pressed is determined, whereby whether or not the menu is to be hidden is determined. If the pushbutton switch 20 is pressed, the process goes to S10; if the pushbutton switch 20 is not pressed, step S145 is repeated after waiting for a predetermined time.

At step S160, the menu 27 displayed on the front layer is hidden for placing the state in a photographable state. Consequently, the partial thumbnail 24 corresponding to the currently selected layout or the belt 22 and the subject image 26 are combined into one for display as on screen 5 in FIG. 9 and screen 8 in FIG. 10.

If the shutter switch 62 is pressed in this state, the subject image output from the image formation section 36 and compressed by the compression-decompression section 38 is stored in the removable memory 56 by the memory controller 50. The associating file describing the path name of the index file corresponding to the currently selected layout is stored in the same folder as the subject image. Consequently, the subject image is stored in the removable memory 56 in association with the currently selected default image.

According to the digital camera of the first embodiment, if the default image selected in the photographing mode does not contain any pixel to be superposed on the subject image, the state in which the default image is selected can be determined easily.

Second Embodiment

Next, an embodiment of the second aspect of the invention will be discussed based on a second embodiment. Description common to that of the first embodiment will not be given and components corresponding to those of the first embodiment will be discussed using the same reference numerals as those in the first embodiment. In the second embodiment, the display position of a belt 22 changes in response to the layout selected in a photographing mode and the belt 22 functions as an object indicating how to hold a camera at the ready in response to the playback orientation of a subject image determined by the selected layout.

Figure 11:
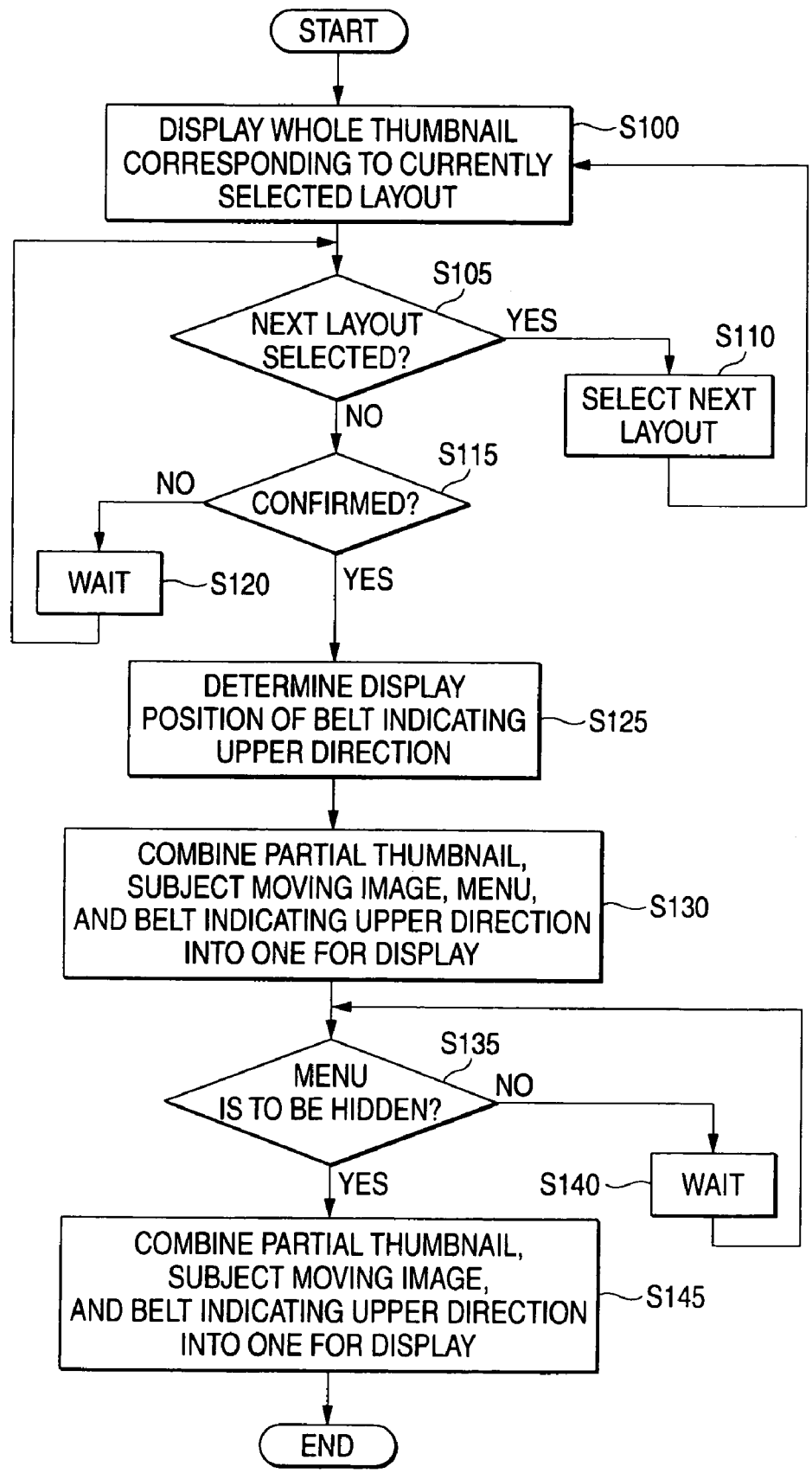
FIG. 11 is a flowchart to show a flow of control processing of an LCD.
Figure 12:
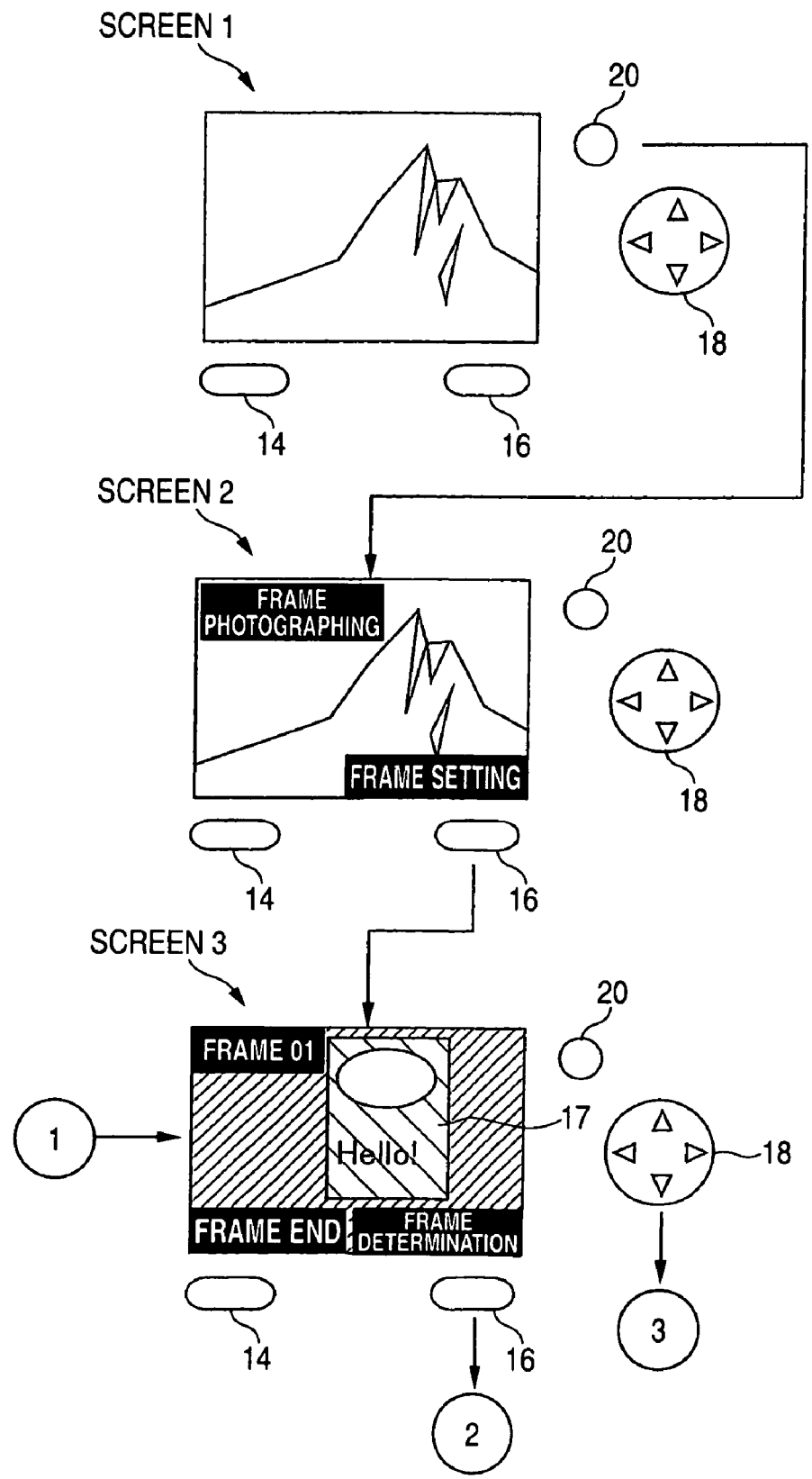
FIG. 12 is a schematic drawing to show screen transition of the LCD.
Figure 13:
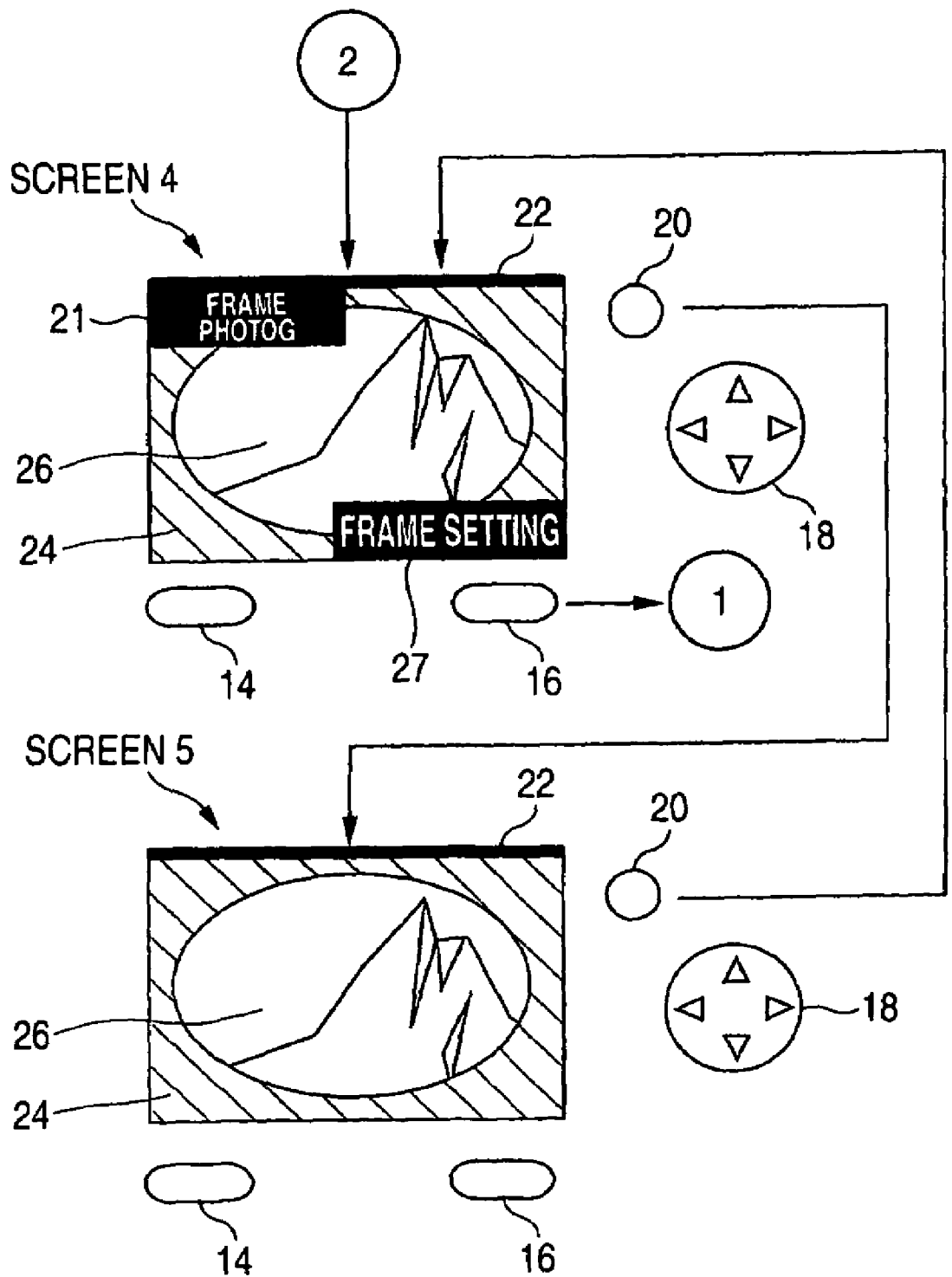
FIG. 13 is a schematic drawing to show screen transition of the LCD.
Figure 14:
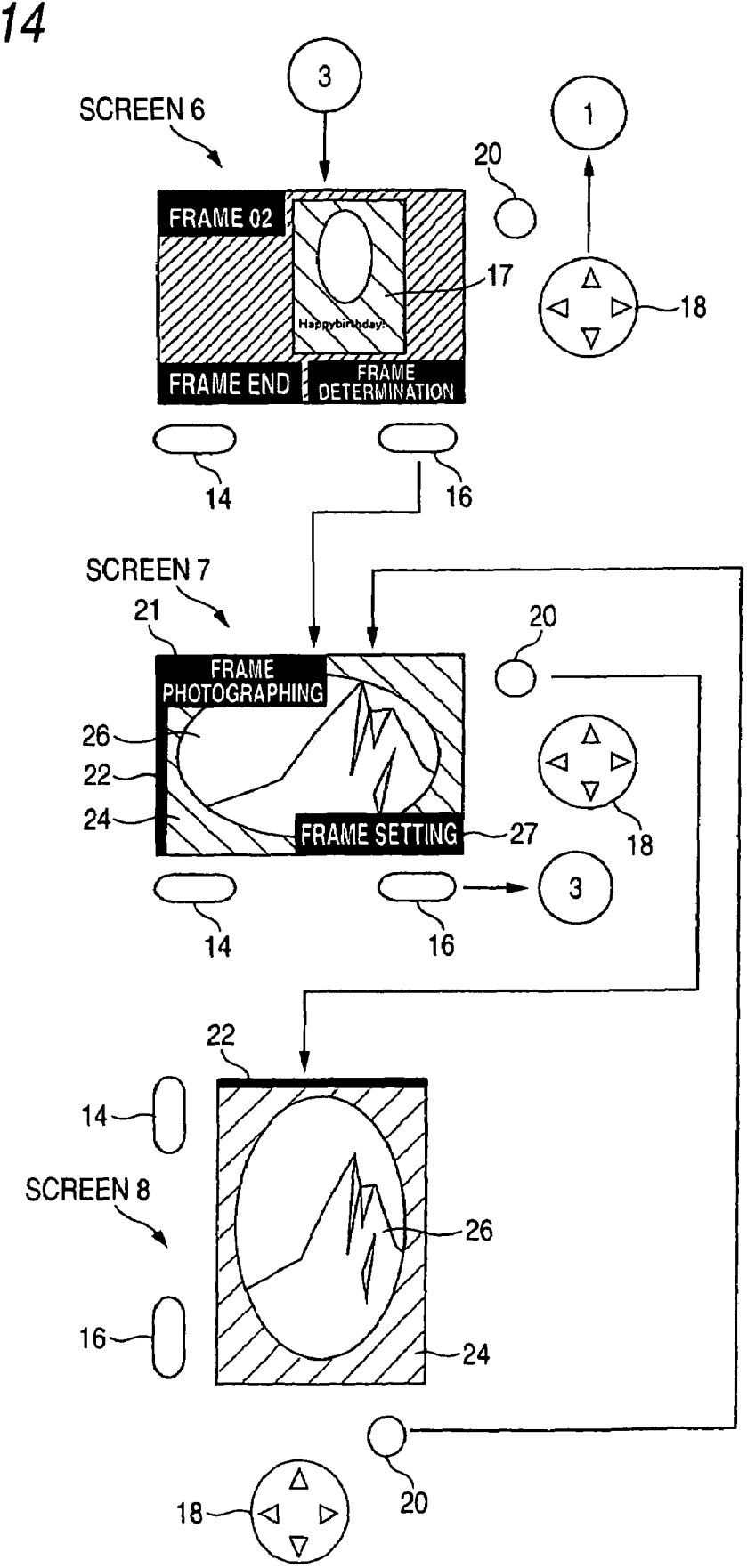
FIG. 14 is a schematic drawing to show screen transition of the LCD.

FIG. 11 is a flowchart to show a flow of control processing of an LCD 54 in the photographing mode of a digital camera according to the second embodiment of the invention. FIGS. 12, 13, and 14 are schematic drawings to show screen transition of the LCD 54. The processing shown in FIG. 11 is started when a pushbutton switch 20 and a pushbutton switch 16 are pressed in succession in the photographing mode, and proceeds as a CPU 42 executes a predetermined program stored in ROM 46. As seen from the description that follows, the CPU 42 functions as selection means, determination means, display control means, image record means, and record means by executing the predetermined program stored in the ROM 46.

At step S100, a whole thumbnail 17 corresponding to the currently selected layout is displayed as on screen 3 in FIG. 12.

At step S105, whether or not a cross key 18 is pressed is determined, whereby whether or not the next layout is selected is determined. If the cross key 18 is pressed, the next layout is selected (S110) and then the process returns to step S100; if the cross key 18 is not pressed, the process goes to S115. Screen 6 in FIG. 14 is an example of the screen displayed at step S100 after the next layout is selected.

At step S115, whether or not the pushbutton switch 16 is pressed is determined, whereby whether or not the currently selected layout is confirmed is determined. If the pushbutton switch 16 is pressed, the process goes to S125; if the pushbutton switch 16 is not pressed, the process returns to step S105 after waiting for a predetermined time (step S120).

At step S125, subordinate information in a camera thumbnail corresponding to the currently selected layout is analyzed, the orientation of the thumbnail and the orientation of a subject image frame are determined, and the display position of the belt 22 indicating the upper direction (see screens 7 and 8 in FIG. 14 and screens 4 and 5 in FIG. 13) is determined in response to the determination result. The belt 22 indicating the upper direction is an object indicating the upper direction with the digital camera correctly held at the ready. The display position of the belt 22 is determined based on the state in which a cabinet 64 is held so that a shutter switch 62 becomes the top. The belt 22 is displayed in the upper margin or the left margin of the screen in the state in which a cabinet 64 is held so that the shutter switch 62 becomes the top. The user can correctly frame by holding the digital camera at the ready holding the cabinet 64 so that the belt 22 indicating the upper direction becomes the top of the screen. The user can easily determine where the belt 22 displayed in the margin of the screen is displayed on the screen if the user gazes steadily at the moving image of the subject.

The object indicating the upper direction with the digital camera correctly held at the ready may be an arrow indicating the upper direction with the digital camera correctly held at the ready. The arrow can indicate any desired direction on the screen and thus can indicate how to correctly hold the digital camera at the ready for the user if an inclined subject image frame is defined in a layout definition file. The object for indicating how to correctly hold the digital camera at the ready for the user in response to the selected layout may be text (for example, "please frame in landscape orientation") or may be a pattern imitating how to hold the digital camera at the ready.

FIG. 15 is a table to show an algorithm for determining the display position of the belt 22 indicating the upper direction by determining whether the playback orientation of the subject image is portrait or landscape. Whether the playback orientation is portrait or landscape can be determined by the orientations of the whole thumbnail and the subject image frame described in the subordinate information in the camera thumbnail. For example, if the whole thumbnail is defined as portrait and the subject image frame is defined as landscape in accordance with the definition rule of the orientation of the subject image frame described in the first embodiment, the playback orientation of the subject image is portrait and therefore how to correctly hold the digital camera at the ready is for the user to frame the subject in portrait orientation. That is, in this case, the subject is framed in portrait orientation, whereby the top and bottom assumed by the layout definition file and the top and bottom of the subject image match. Therefore, when the whole thumbnail is defined as portrait and the subject image frame is defined as landscape, if the digital camera is correctly held at the ready, the left margin of the LCD 54 becomes the top and the right margin becomes the bottom and thus the display position of the belt 22 indicating the upper direction is the left margin of the LCD 54. In short, at step S125, whether the playback orientation is portrait or landscape is determined, whereby whether the subject is to be framed in portrait or landscape orientation is determined. The top and bottom assumed by the layout definition file are determined specifically, for example, by the pattern or text of a default image. If the display position of the belt 22 indicating the upper direction is determined by determining the orientations of the whole thumbnail and the subject image frame described in the subordinate information in the camera thumbnail, the playback orientation defined in the layout definition file can be detected precisely.

From the coordinates of the subject image frame defining the placement area at the playback time, the lengths of the length and width of the frame are calculated and the playback orientation of the subject image may be determined by the lengths of the length and width of the frame instead of determining the playback orientation of the subject image by the orientations of the whole thumbnail and the subject image frame as information defining the playback orientation. In this case, it becomes unnecessary to define the playback orientation as the subordinate information. For the coordinates of the subject image frame, the script described in the layout definition file may be referenced or the subordinate information described in the camera thumbnail may be referenced.

At step S130 shown in FIG. 11, a partial thumbnail 24 corresponding to the currently selected layout, a subject moving image 26, menus 21 and 27, and the belt 22 indicating the upper direction are combined into one for display as on screen 4 in FIG. 13 and screen 7 in FIG. 14. Specifically, the following processing is performed: The menus 21 and 27 and the belt 22 indicating the upper direction are displayed on the front layer based on predetermined data read from ROM 46. At this time, the belt 22 indicating the upper direction is displayed at the display position determined at step S125. The subject moving image 26 made of the subject image output at predetermined time intervals from an image formation section 36 is displayed on the back layer. The partial thumbnail corresponding to the currently selected layout is displayed on the layer between the two layers.

At step S135, whether or not the pushbutton switch 20 is pressed is determined, whereby whether or not the menus are to be hidden is determined. If the pushbutton switch 20 is pressed, the process goes to S145; if the pushbutton switch 20 is not pressed, step S135 is repeated after waiting for a predetermined time.

At step S145, the menus 21 and 27 displayed on the front layer are hidden for placing the state in a photographable state. Consequently, the partial thumbnail 24 corresponding to the currently selected layout, the subject moving image 26, and the belt 22 indicating the upper direction are combined into one for display as on screen 5 in FIG. 13 and screen 8 in FIG. 14.

If the shutter switch 62 is pressed in this state, the subject image output from the image formation section 36 and compressed by a compression-decompression section 38 is stored in removable memory 56 by a memory controller 50. The associating file describing the path name of the index file corresponding to the currently selected layout is stored in the same folder as the subject image. Consequently, the subject image is stored in the removable memory 56 in association with the currently selected layout.

According to the digital camera of the second embodiment, if a layout at the playback time is selected before a subject is recorded, the belt 22 indicating the upper direction is displayed on the LCD 54 in response to the layout at the playback time, so that appropriate framing responsive to the layout is possible.

Third Embodiment

Next, an embodiment of the second aspect of the invention will be discussed based on a third embodiment.

Figure 16:
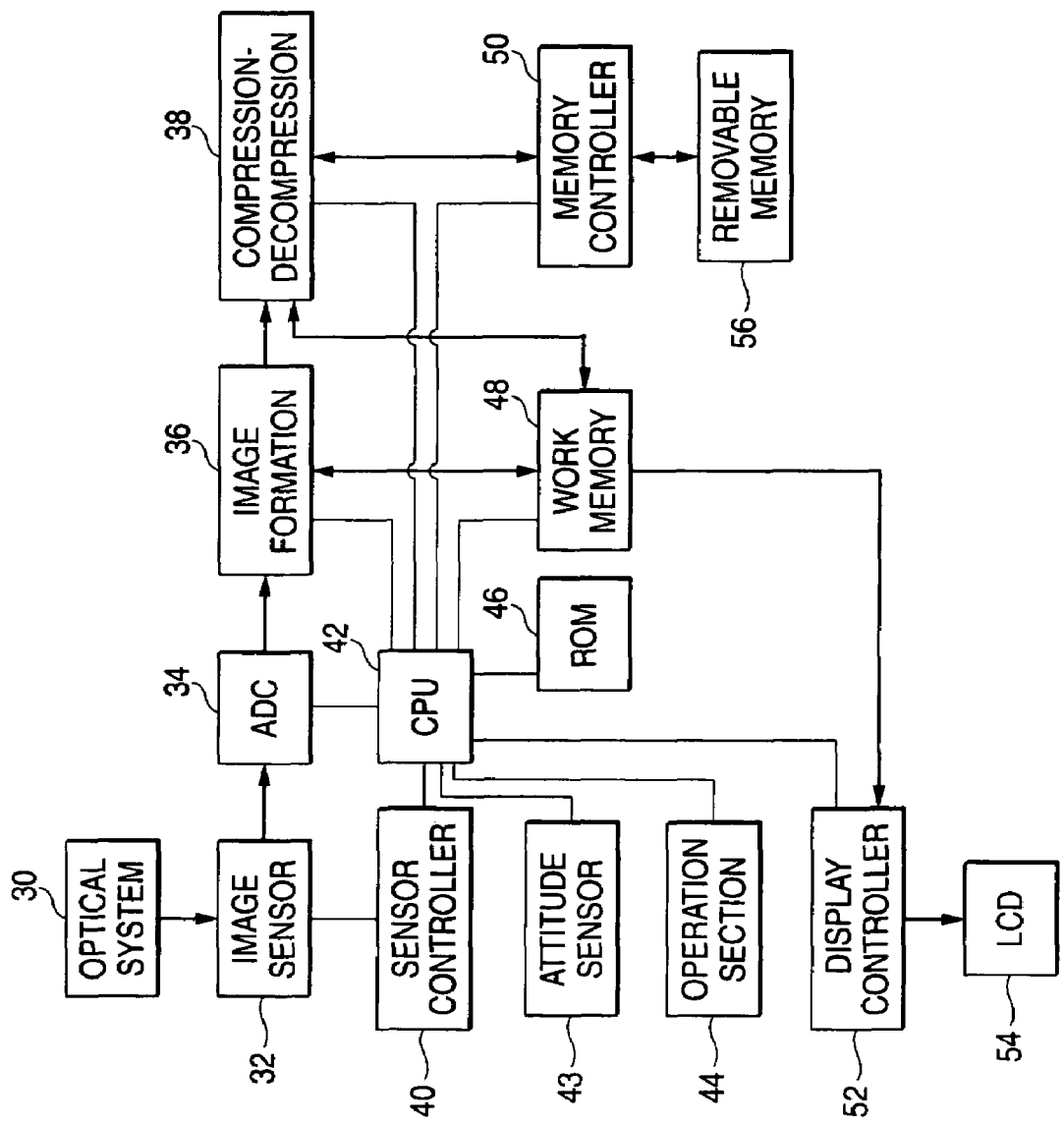
FIG. 16 is a block diagram to show a digital camera of a second embodiment of the invention.

FIG. 16 is a block diagram to show a digital camera according to the third embodiment of the invention. Parts substantially identical with those described in the first embodiment are denoted by the same reference numerals in FIG. 16 and will not be discussed again.

An attitude sensor 43 as attitude detection means is a sensor for detecting the rotation angle of a cabinet 64 when the cabinet 64 is rotated with the optical axis of a lens 68 as the rotation center axis. As the rotation angle is detected, whether the user frames in landscape or portrait orientation can be determined.

Figure 17:
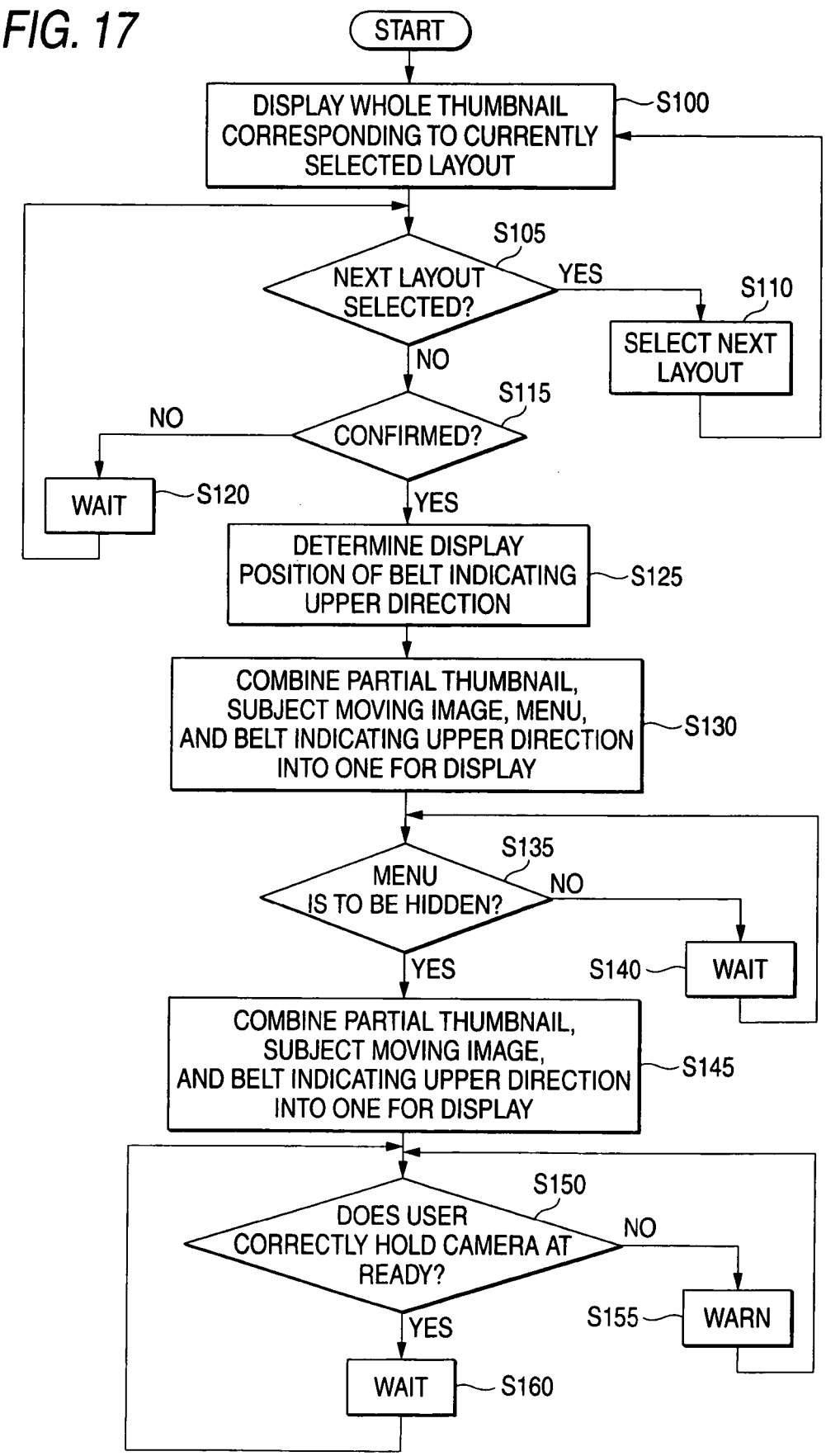
FIG. 17 is a flowchart to show a flow of control processing of an LCD.

FIG. 17 is a flowchart to show a flow of control processing of an LCD 54 in a photographing mode of the digital camera according to the third embodiment of the invention. Steps S100 to S145 are substantially identical with those described in the second embodiment and therefore will not be discussed again.

At step S150, whether or not the user correctly holds the digital camera at the ready is determined based on the display position of a belt 22 indicating the upper direction determined at step S125 and an output signal of the attitude sensor 43. Specifically, for example, whether the user frames in landscape or portrait orientation is determined by the output signal of the attitude sensor 43 and if the belt 22 is displayed in the upper margin of the screen and framing in landscape orientation is adopted or if the belt 22 is displayed in the right margin of the screen and framing in portrait orientation is adopted, it is determined that the user correctly holds the digital camera at the ready. If the user correctly holds the digital camera at the ready, processing of returning to step S150 after waiting for a predetermined time (step S160) is repeated until a shutter switch 62 is pressed. If the user does not correctly hold the digital camera at the ready, the process goes to step S155.

At step S155, the intensity of the whole screen is varied periodically, a specific message is displayed (for example, "You do not correctly hold the digital camera at the ready. Hold the digital camera at the ready so that the belt becomes the top."), or a warning beep is sounded, thereby warning the user for incorrect holding the digital camera at the ready.

According to the third embodiment, if the user does not correctly hold the digital camera at the ready, display or sound is produced for the user as a warning, so that the user can easily take a photograph.

The embodiments have been described assuming that the layout defined in each layout definition file is a layout at the printing time, but the layout definition file may define a layout at the display time.

What is claimed is:

1. A digital camera comprising:
an optical system for forming an optical image of a subject;
a conversion unit that converts the formed optical image of the subject into a digital image;
a selection unit that selects a layout at the playback time of the digital image output by the conversion unit;
a display;
a determination unit that determines whether playback orientation of the digital image output by the conversion unit is portrait or landscape based on an orientation of a whole thumbnail representing entirety of the layout and an orientation of a frame for placing the digital image, which are described in subordinate information of a camera thumbnail for displaying the layout on the display, and the determination unit that determines a display position of an object indicating how to hold the digital camera at the ready based on the determination result and the selected layout;
a display controller that combines the object and an image output by the conversion unit to display on the display based on the determined display position in a state in which a still image record command can be entered; and
an image recorder that stores a digital still image output by the conversion unit in nonvolatile memory in association with the selected layout when a still image record command is entered.

2. The digital camera as claimed in claim 1, wherein the determination unit determines the playback orientation of the digital image output by the conversion unit by information defining the playback orientation of the digital image output by the conversion unit.

3. The digital camera as claimed in claim 1, wherein the determination unit determines the playback orientation of the digital image output by the conversion unit by coordinates defining a placement area of the digital image output by the conversion unit at the playback time of the digital image.

4. The digital camera as claimed in claim 1, wherein the object is a pattern indicating an upper direction in a state in which said digital camera is correctly held at the ready.

5. The digital camera as claimed in claim 1, wherein the object is a belt-like pattern displayed in a margin of a screen as an upper margin in a state in which said digital camera is correctly held at the ready.

6. The digital camera as claimed in claim 1, wherein the object is an arrow indicating an upper direction in a state in which said digital camera is correctly held at the ready.

7. The digital camera as claimed in claim 1, further comprising: an attitude detection unit that detects an attitude of a cabinet housing said optical system; and a warning unit that issues a warning in response to the detected cabinet attitude and the determined playback orientation.

8. A display control method of a digital camera comprising an optical system for forming an optical image of a subject, a conversion unit for converting the formed optical image of the subject into a digital image, a selection unit for selecting a layout at the playback time of the digital image output by the conversion unit, and a display, the method comprising:

determining whether playback orientation of the digital image output by the conversion unit is portrait or landscape based on an orientation of a whole thumbnail representing entirety of the layout and an orientation of a frame for placing the digital image, which are described in subordinate information of a camera thumbnail for displaying the layout on the display;

determining a display position of an object indicating how to hold the digital camera at the ready based on the determination result and the selected layout;

combining the object and an image output by the conversion unit to display on the display based on the determined display position in a state in which a still image record command can be entered; and storing a digital still image output by the conversion unit in nonvolatile memory in association with the selected layout when a still image record command is entered.

\* \* \* \* \*